United States Patent
Laycock et al.

(10) Patent No.: US 6,376,645 B1
(45) Date of Patent: Apr. 23, 2002

(54) COMPLEXING AGENT-MODIFIED HEXACYANOMETALLATE HEXANITROMETALLATE CATALYSTS

(75) Inventors: David E. Laycock, Ontario; Kendra L. Flagler, Fenelon Falls, both of (CA); Robert J. Gulotty, Jr., Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/574,925

(22) Filed: May 19, 2000

Related U.S. Application Data

(60) Provisional application No. 60/143,088, filed on Jul. 9, 1999.

(51) Int. Cl.[7] .......................... C07C 43/11; C08G 59/68; C08G 65/12; B01J 31/12
(52) U.S. Cl. ....................... 528/412; 502/153; 502/156; 528/414; 528/415; 568/606
(58) Field of Search ................................ 528/414, 415, 528/412; 502/153, 156; 568/606

(56) References Cited

U.S. PATENT DOCUMENTS

| | | | | |
|---|---|---|---|---|
| 3,278,457 A | | 10/1966 | Milgrom | |
| 3,278,458 A | | 10/1966 | Belner | |
| 3,278,459 A | | 10/1966 | Herold | |
| 3,404,109 A | | 10/1968 | Milgrom | |
| 3,427,256 A | | 2/1969 | Milgrom | |
| 3,427,334 A | | 2/1969 | Belner | 260/429 |
| 3,427,335 A | | 2/1969 | Herold | 260/429 |
| 3,829,505 A | * | 8/1974 | Herold | 568/606 |
| 4,477,589 A | * | 10/1984 | van der Hulst et al. | 528/415 X |
| 5,266,681 A | * | 11/1993 | Reisch et al. | 528/414 |
| 5,470,813 A | | 11/1995 | Le-Khac | 502/156 |
| 5,482,908 A | | 1/1996 | Le-Khac | 502/156 |
| 5,589,431 A | | 12/1996 | Le-Khac | 502/175 |
| 5,627,120 A | * | 5/1997 | Le-Khac | 502/156 |
| 5,767,323 A | * | 6/1998 | Televantos et al. | 568/613 |
| 6,204,357 B1 | * | 3/2001 | Ooms et al. | 502/153 X |

FOREIGN PATENT DOCUMENTS

| | | | |
|---|---|---|---|
| CN | 1044663 A | 8/1990 | |
| WO | WO99/16775 | 4/1999 | ............ C07F/15/06 |

OTHER PUBLICATIONS

Herold et al., Hexacyanometalate Salt Complexes as Catalysts for Epoxide Polymerizations, ACS Polymerization Kinetics and Technology, vol. 128, p. 208 (1973).

Livigni et al., Poly(Propylene Ether) Polyols Prepared With a Zinc Hexacyanocobaltate Complex Catalyst, polyethers, pp. 20–37 ACS Symp. Ser. (1975), 6 (Polyethers, Symp., 1974).

* cited by examiner

Primary Examiner—Richard D. Lovering

(57) ABSTRACT

Metal [hexacyanometallate hexanitrometallate] complexes are useful alkylene oxide polymerization catalysts. The metal is any that forms a precipitate with hexacyanometallate and hexanitrometallate groups. These catalysts are made from less expensive raw materials than the common zinc hexacyanocobaltate catalysts, and provide short induction periods and in many cases more controlled exotherms.

19 Claims, No Drawings

COMPLEXING AGENT-MODIFIED HEXACYANOMETALLATE HEXANITROMETALLATE CATALYSTS

CROSS-REFERENCE TO RELATED APPLICATION

This application is related to and claims priority under 35 USC §120 from U.S. Provisional Application Ser. No. 60/143,088, filed Jul. 9, 1999. That provisional application is hereby incorporated by reference in its entirety.

BACKGROUND OF THE INVENTION

This invention relates to metal catalysts for alkylene oxide polymerization.

Alkylene oxides such as ethylene oxide, propylene oxide and 1,2-butylene oxide are polymerized to form a wide variety of polyether products. For example, polyether polyols are prepared in large quantities for polyurethane applications. Other polyethers are used as lubricants, brake fluids, compressor fluids, and many other applications.

These polyethers are commonly prepared by polymerizing one or more alkylene oxides in the presence of an initiator compound and an alkali metal catalyst. The initiator compound is typically a material having one or more hydroxyl, primary or secondary amine, carboxyl or thiol groups. The function of the initiator is to set the nominal functionality (number of hydroxyl groups/molecule) of the product polyether, and in some instances to incorporate some desired functional group into the product.

Until recently, the catalyst of choice was an alkali metal hydroxide such as potassium hydroxide. Potassium hydroxide has the advantages of being inexpensive, adaptable to the polymerization of various alkylene oxides, and easily recoverable from the product polyether.

However, to a varying degree, alkali metal hydroxides catalyze an isomerization of propylene oxide to form allyl alcohol. Allyl alcohol acts as a monofunctional initiator during the polymerization of propylene oxide. Thus, when potassium hydroxide is used to catalyze a propylene oxide polymerization, the product contains allyl alcohol-initiated, monofunctional impurities. As the molecular weight of the product polyether increases, the isomerization reaction becomes more prevalent. Consequently, 800 or higher equivalent weight poly(propylene oxide) products prepared using KOH as the catalyst tend to have very significant quantities of the monofunctional impurities. This tends to reduce the average functionality and broaden the molecular weight distribution of the product.

More recently, the so-called double metal cyanide (DMC) catalysts have been used commercially as polymerization catalysts for alkylene oxides. Because some of these catalysts do not significantly promote the isomerization of propylene oxide, polyethers having low unsaturation values and higher molecular weights can be prepared, compared to those made with potassium hydroxide.

These DMC catalysts are described, for example, in U.S. Pat. Nos. 3,278,457, 3,278,458, 3,278,459, 3,404,109, 3,427,256, 3,427,334, 3,427,335 and 5,470,813, among many others. The composition of these catalysts can vary widely, but can generally be represented by the formula

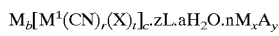

wherein M is a metal ion that forms an insoluble precipitate with the metal cyanide grouping $M^1(CN)_r(X)_t$ and which has at least one water soluble salt;

$M^1$ is a transition metal ion;

X represents a group other than cyanide that coordinates with the $M^1$ ion;

L represents an organic complexing agent;

A represents an anion that forms a water-soluble salt with the M ion;

b and c are numbers that reflect an electrostatically neutral complex;

r is from 4 to 6; t is from 0 to 2; and z, n and a are positive numbers (which may be fractions) indicating the relative quantities of the complexing agent, water molecules and $M_xA_y$, respectively.

However, experience has shown that most of the possible combinations of M, $M^1$, X, L, r and t do not provide a catalyst having sufficient activity to be of commercial interest. Most combinations show virtually no activity at all. In addition, not all of those possible combinations of M, M, X, L, r and t provide very low unsaturation poly(propylene oxide) polymers. Recently, developmental and commercial efforts have focussed almost exclusively on zinc hexacyanocobaltate, together with a specific complexing agent, t-butanol.

As described in U.S. Pat. No. 5,470,813, one disadvantage of DMC catalysts is that they tend to require an induction period of close to an hour to many hours in some cases before becoming active. Little polymerization occurs during this induction period, but it is followed by a strongly exothermic reaction. For some operations, particularly continuous polymerization processes, it would be desirable to reduce this induction period and to provide a less strongly exothermic reaction.

It would be desirable, therefore, to provide an active catalyst for polymerizing alkylene oxides, which is less expensive to prepare than zinc hexacyanocobaltate complexes. It would be even more desirable to provide such a catalyst that exhibits a short induction period before rapidly polymerizing alkylene oxides, and especially desirable if the catalyst provides for a more controlled exotherm when rapid polymerization commences.

SUMMARY OF THE INVENTION

In one aspect, this invention is a metal catalyst represented by the general structure:

wherein M and $M^3$ are metal ions that form an insoluble precipitate with the $M^1(CN)_6$ and $M^2(NO_2)_6$ ions, and which have at least one water soluble salt;

$M^1$ and $M^2$ are trivalent transition metal ions;

L represents an organic complexing agent;

A represents an anion that forms a water-soluble salt with the $M^3$ ion;

b, c and d are numbers that reflect an electrostatically neutral complex, with the ratio of c:d being from about 50:50 to about 99:1; and z, n and a are positive numbers (which may be fractions) indicating the relative quantities of the complexing agent, water molecules and $M^3{}_xA_y$, respectively.

In another aspect, this invention is an improvement in a process for polymerizing an epoxide compound, wherein the polymerization is conducted in the presence of the catalyst of the first aspect.

In a third aspect, this invention is a method of making an active polymerization catalyst, comprising (a) forming a first solution of water soluble hexacyanometarate and hexanitrometallate compounds, said hexacyanometallate and hexanitrometallate compounds being present in proportions such that said solution contains a molar ratio of hexacyanometallate to hexanitrometallate ions of about 50:50 to 99:1.

(b) mixing said first aqueous solution with a second solution of a water soluble salt of a metal that forms a water-insoluble precipitate with hexacyanometallate and hexanitrometallate ions so as to precipitate a metal [hexacyanometallate hexanitrometallate], and (c) either simultaneously or after step (b), contacting said metal [hexacyanometallate hexanitrometallate] with an organic complexing agent and, if no stoichiometric excess of metal salt is used in step (b), an additional quantity of a metal salt.

It has been found that the metal [hexacyanometallate hexanitrometallate] complex of the invention has excellent activity as an epoxide polymerization catalyst. The complexes, particularly those containing higher levels of hexanitrometallate ion, tend to have very short induction periods. In many cases, they provide a well-controlled exotherm at the start of polymerization. Often, the catalysts provide poly(propylene oxide) polymers with levels of unsaturation below 0.01 meg/q.

DETAILED DESCRIPTION OF THE INVENTION

The catalyst of this invention is a metal hexacyanometallate hexanitrometallate that is complexed with an organic complexing agent. As used herein, "hexacyanometallate" refers to a group having the structure $[M^1(CN)_6]^{3-}$, where $M^1$ is as described before. "Hexanitrometallate" refers to a group having the structure $[M^2(NO_2)_6]^{3-}$, where $M^2$ is as described before. $M^1$ and $M^2$ are preferably $Fe^{+3}$, $Co^{+3}$, $Cr^{+3}$, $Mn^{+3}$, $Ir^{+3}$ and $Rh^{+3}$. $Co^{+3}$ and $Fe^{+3}$ are even more preferred and $Co^{+3}$ is most preferred. $M^1$ and $M^2$ may be the same or different, but preferably are both the same and most preferably are both $Co^{+3}$.

The hexacyanometallate and hexanitrometallate groups are present in molar ratios of from about 50:50, preferably from about 75:25, more preferably from about 80:20, to about 99:1, preferably to about 96:4.

M and $M^3$ are suitably $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$. M and $M^3$ are more preferably $Zn^{+2}$, $Fe^{+2}$, $Co^{+2}$, $Ni^{+2}$, $La^{+3}$ and $Cr^{+2}$. $Zn^{+2}$ is especially preferred. M and $M^3$ are preferably the same.

The catalyst is complexed with an organic complexing agent. A great number of complexing agents are potentially useful, although catalyst activity may vary according to the selection of a particular complexing agent. Examples of such complexing agents include alcohols, aldehydes, ketones, ethers, amides, nitrites, sulfides, and the like.

Suitable alcohol complexing agents include monoalcohols and polyalcohols. Suitable monoacohols include methanol, ethanol, n-propanol, isopropanol, n-butanol, isobutanol, t-butanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol, 1-t-butoxy-2-propanol and the like. Suitable monoalcohols also include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol as well as nitroalcohols, ketoalcohols, ester-alcohols, cyanoalcohols, and other inertly substituted alcohols.

Suitable polyalcohols include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol, sucrose, sorbitol, alkyl glucosides such as methyl glucoside and ethyl glucoside, and the like. Low molecular weight polyether polyols, particular those having an equivalent weight of about 350 or less, more preferably about 125–250, are also useful complexing agents.

Suitable aldehydes include formaldehyde, acetaldehyde, butyraldehyde, valeric aldehyde, glyoxal, benzaldehyde, toluic aldehyde and the like. Suitable ketones include acetone, methyl ethyl ketone, 3-pentanone, 2-hexanone and the like.

Suitable ethers include cyclic ethers such as dioxane, trioxymethylene and paraformaldehyde as well as acyclic ethers such as diethyl ether, 1-ethoxy pentane, bis-(betachloro ethyl) ether, methyl propyl ether, diethoxy methane, dialkyl ethers of alkylene or polyalkylene glycols (such as ethylene glycol dimethyl ether, diethylene glycol dimethyl ether, triethylene glycol dimethyl ether and octaethylene glycol dimethyl ether), and the like.

Amides such as formamide, acetamide, propionamide, butyramide and valeramide are useful complexing agents. Esters such as amyl formate, ethyl formate, hexyl formate, propyl formate, ethyl acetate, methyl acetate, triethylene glycol diacetate and the like can be used as well. Suitable nitriles include acetonitrile, proprionitrile and the like. Suitable sulfides include dimethyl sulfide, diethyl sulfide, dibutyl sulfide, diamyl sulfide and the like.

Compounds having an S=O group, such as dimethyl sulfoxide and sulfolane, are also useful complexing agents.

Preferred complexing agents are t-butanol, 1-t-butoxy-2-propanol, dimethyl sulfoxide (DMSO), polyether polyols having an equivalent weight of about 75–350 and dialkyl ethers of alkylene or polyalkylene glycols. Especially preferred complexing agents are t-butanol, 1-t-butoxy-2-propanol, DMSO, polyether polyols having an equivalent weight of 125–250, and a dimethyl ether of mono-, di- or triethylene glycol. t-Butanol, DMSO and glyme (1,2-dimethoxy ethane) are especially preferred.

In addition, the catalyst complex typically contains a quantity of water that is bound into the crystalline lattice of the complex.

In addition to the water and organic complexing agent, it has been found that handling and filtering the catalyst complex is easier if is treated with a polyether polyol of a molecular weight of about 300–4000, as described more below.

The catalyst complex is conveniently made by dissolving water-soluble hexacyanometallate and hexanitrometallate compounds in water and combining the resulting solution(s) with an aqueous solution of a water soluble salt of the M ion. The hexacyanometallate and hexanitrometallate solutions can be made individually, or as a single solution. If made separately, the hexacyanometallate and hexanitrometallate solutions are either blended before being added to the solution of the metal salt, or else are added simultaneously to the solution of the metal salt. Upon mixing the solutions, a metal [hexacyanometallate hexanitrometallate] complex precipitates. The precipitate is treated with an organic complexing agent of the type described above, and optionally is treated with a polyether polyol as well.

Any water-soluble hexacyanometallate and hexanitrometallate compounds can be used. Preferably, the compounds are those represented by the structures $B_3[M^1(CN)_6]$ and $B_3[M^2NO_2]_6$, where B is hydrogen or an alkali metal. B is preferably hydrogen, sodium or potassium. Compounds in which B is hydrogen are conveniently formed by passing an aqueous solution of the corresponding alkali metal salt through a cation-exchange resin that is in the hydrogen form.

The metal salt is any water-soluble compound of the M ion that will react with the hexacyanometallate and hexanitrometallate compounds to form a metal [hexacyanometallate hexanitrometallate] precipitate. The metal salt suitably is one represented by the structure $M_xA_y$, where M, A, x and y are as defined before. Suitable anions A include halides such as chloride and bromide, nitrate, sulfate, carbonate, cyanide, oxalate, thiocyanate,; isocyanate, isothiocyanate, and $C_{1-4}$ carboxylate. Chloride ion is especially preferred.

Especially suitable metal salts include zinc halides, zinc hydroxide, zinc sulfate, zinc carbonate, zinc cyanide, zinc oxalate, zinc thiocyanate, zinc isocyanate, zinc $C_{1-4}$ carboxylates, and zinc nitrate. Zinc chloride, zinc acetate and zinc nitrate are most preferred.

The catalyst complex is precipitated by mixing the solution of the metal salt with the solution(s) of the hexacyanometallate and hexanitrometallate compounds. The temperature of mixing is not critical, provided that the starting materials remain in solution until the mixing is performed. Temperatures of about 10° C. up to the boiling temperature of the solution, particularly 15–35° C., are most suitable. The mixing can be done with rapid agitation. Intimate mixing techniques as are described in U.S. Pat. No. 5,470,813 can be used, but are not necessary.

In this initial mixing, at least a stoichiometric amount of the metal salt is used. In one variation, a stoichiometric excess of metal salt is used in the initial mixing. In another variation described more below, only a stoichiometric amount of metal salt is used in the initial mixing, with additional metal salt being added in a later step. By "stoichiometric amount", it is meant an amount sufficient to form an electrostatically neutral precipitate with the hexacyanometallate and hexanitro-metallate ions, with substantially no excess of the metal salt being used.

The complexing agent, either neat or as an aqueous solution, typically is added before significant precipitation of the metal [hexacyanometallate hexanitrometallate] occurs, generally by adding the complexing agent immediately after mixing the solutions of metal salt and hexacyanometallate and hexanitrometallate. If desired, the complexing agent can be mixed into the metal salt solution or the hexacyanometallate and hexanitrometallate solution, or both. After adding this initial amount of complexing agent, the mixture is generally stirred for several minutes to allow the desired catalyst complex to form and precipitate.

The resulting precipitated catalyst complex is then recovered by a suitable technique such as filtration. Preferably, the catalyst complex is subjected to one or more subsequent washings with water, complexing agent, polyether polyol (when used) or some combination thereof. This is conveniently done by re-slurrying the catalyst in the liquid with agitation for several minutes and filtering. Washing is preferably continued at least until essentially all unwanted ions, particularly alkali metal and halide ions, are removed from the complex.

When a polyether polyol is used in the catalyst complex, it can be added with the initial amount of complexing agent, or in one or more subsequent washings of the complex.

The final catalyst complex is conveniently dried, preferably under vacuum and moderately elevated temperatures (such as from about 50–60° C.) to remove excess water and volatile organics. Drying is preferably done until the catalyst complex reaches a constant weight.

In an alternative technique for forming the catalyst complex, an aqueous solution containing only a stoichiometric amount of metal salt in relation to the combined amount hexacyanometallate and hexanitrometallate compounds is used in the initial mixing and precipitation step. After the initial precipitation is complete, the precipitate is washed with water to remove unwanted ions. The precipitate is then combined with a small amount of a solution containing water, additional metal salt, and complexing agent. The metal salt used may the same as that used in forming the precipitate, or may be a salt of a different metal. The amount of this added solution is preferably that amount which is absorbed by the precipitate. A typical amount of solution to be used is from about 0.5, preferably from about 0.8, more preferably from about 1, to about 2, preferably to about 1.5, milliliters of solution per gram of isolated precipitate. The amount of metal salt added with this solution is advantageously about 9, preferably about 11 to about 30, preferably to about 25, parts by weight per 100 parts by weight of the isolated precipitate. The complexing agent is advantageously present in a weight ratio of about 90:10 to about 10:90, preferably about 70:30 to about 30:70, with the water. If desired, a polyether polyol can be included in the solution. The resulting catalyst complex can be dried and used without further treatment, or may be subjected to additional washings with water as before, although it is preferred not to perform additional washings with complexing agent or polyether polyol.

In addition, the catalyst may be formed directly as a dispersion in an initiator compound, as described in copending application Ser. No. 09/574,847, filed May 19, 2000, entitled Method for Preparing Metal Cyanide Catalyst/Polyol Initiator Slurries.

Furthermore, it is also possible to form a filterable and/or supported catalyst by precipitating the catalyst in the presence of a polycarboxyl or polycarboxylate compound, as described in copending application Ser. No. 09/574,848, filed May 19, 2000, entitled Method for Preparing Metal Cyanide Catalysts using Polycarboxylic Acids, or in the presence of a silane-functional complexing agent, as described in the copending application Ser. No. 09/574,842, filed May 19, 2000, entitled Method for Preparing Metal Cyanide Catalysts using Silane-functional Ligands.

The catalyst complex of the invention is used to polymerize alkylene oxides to make polyethers. In general, the process includes mixing a catalytically effective amount of the catalyst with an alkylene oxide under polymerization conditions, and allowing the polymerization to proceed until the supply of alkylene oxide is essentially exhausted. The concentration of the catalyst is selected to polymerize the alkylene oxide at a desired rate or within a desired period of time. Generally, a suitable amount of catalyst is from about 5 to about 10,000 parts by weight metal cyanide catalyst per million parts combined weight of alkylene oxide, and initiator and comonomers, if present. More preferred catalyst levels are from about 10, especially from about 25, to about 500, more preferably about 100 ppm, most preferably about 50 ppm, on the same basis.

For making high molecular weight monofunctional polyethers, it is not necessary to-include an initiator compound. However, to control molecular weight, impart a desired functionality (number of hydroxyl groups/molecule) or a desired functional group, an initiator compound is preferably mixed with the catalyst complex at the beginning of the reaction. Suitable initiator compounds include monoalcohols such methanol, ethanol, n-propanol, isopropanol, n-butanol, isobutanol, t-butanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol and the like. Suitable monoalcohol initiator compounds include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol and 1-t-butoxy-2-propanol as well as nitroalcohols, keto-alcohols, ester-alcohols, cyanoalcohols, and other inertly substituted alcohols. Suitable polyalcohol initiators include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol, sucrose, sorbitol, alkyl glucosides such as methyl glucoside and ethyl glucoside and the like. However, the catalyst tends to perform better when the initiator is a polyether polyol, particularly one having an equivalent weight of about 350 or less, more preferably about 125–250.

Among the alkylene oxides that can be polymerized with the catalyst complex of the invention are ethylene oxide, propylene oxide, 1,2-butylene oxide, styrene oxide, and mixtures thereof. Various alkylene oxides can be polymerized sequentially to make block copolymers. More preferably, the alkylene oxide is propylene oxide or a mixture of propylene oxide and ethylene oxide and/or butylene oxide. Especially preferred are propylene oxide along or a mixture of at least 75 weight % propylene oxide and up to about 25 weight % ethylene oxide.

In addition, monomers that will copolymerize with the alkylene oxide in the presence of the catalyst complex can be used to prepare modified polyether polyols. Such comonomers include oxetanes as described in U.S. Pat. Nos. 3,278,457 and 3,404,109 and anhydrides as described in U.S. Pat. Nos. 5,145,883 and 3,538,043, which yield polyethers and polyester or polyetherester polyols, respectively. Hydroxyalkanoates such as lactic acid, 3-hydroxybutyrate, 3-hydroxyvalerate (and their dimers), lactones and carbon dioxide are examples of other suitable monomers that can be polymerized with the catalyst of the invention.

The polymerization reaction typically proceeds well at temperatures from about 25 to about 150° C., preferably from about 80–130° C. A convenient polymerization technique involves mixing the catalyst complex and initiator, and pressuring the reactor with the alkylene oxide. Polymerization proceeds after a short induction period, as indicated by a loss of pressure in the reactor. Induction periods of from less to one minute to about 20 minutes are commonly seen, and induction periods are often less than 10 minutes. Once the polymerization has begun, additional alkylene oxide is conveniently fed to the reactor on demand until enough alkylene oxide has been added to produce a polymer of the desired equivalent weight.

Another convenient polymerization technique is a continuous method. In such continuous processes, an activated initiator/catalyst mixture is continuously fed into a continuous reactor such as a continuously stirred tank reactor (CSTR) or a tubular reactor. A feed of alkylene oxide is introduced into the reactor and the product continuously removed.

The catalyst of this invention is especially useful in making propylene oxide homopolymers and random copolymers of propylene oxide and up to about 15 weight percent ethylene oxide (based on all monomers). The polymers of particular interest have a hydroxyl equivalent weight of from about 800, preferably from about 1000, to about 5000, preferably about 4000, more preferably to about 2500, and unsaturation of no more than 0.02 meq/g, preferably no more than about 0.01 meq/g.

The product polymer may have various uses, depending on its molecular weight, equivalent weight, functionality and the presence of any functional groups. Polyether polyols so made are useful as raw materials for making polyurethanes. Polyethers can also be used as surfactants, hydraulic fluids, as raw materials for making surfactants and as starting materials for making aminated polyethers, among other uses.

The following examples are provided to illustrate the invention, but are not intended to limit its scope. All parts and percentages are by weight unless otherwise indicated.

EXAMPLE 1

A. Preparation of Catalyst Complex A

A solution of 0.16 g (0.0004 mol) of sodium hexanitrocobaltate in 4 mL of water is passed through a column a macropordus styrene-divinylbenzene strong acid cation exchange resin (Dowex MSC-1, available from The Dow Chemical Company) in the hydrogen form. Enough resin is used to provide an excess of hydrogen ions. The resulting $H_3Co(NO_2)_6$ solution is added to a stirred solution of 7.84 g (0.024 mol) of potassium hexacyanocobaltate in 137 mL of water. The resulting mixture is added to a solution of 25 g of zinc chloride in 40 mL of water in a homogenizer and homogenized for several seconds. A 50/50 by volume solution of t-butanol and water (200 mL) is added, and the mixture homogenized for 10 minutes. The resulting slurry is poured into a stirred beaker and 200 mL water, 2 mL t-butanol and 2 g of a 4000 molecular weight nominally trifunctional poly(propylene oxide) are added. The slurry is then stirred another three minutes, and filtered through a Buchner funnel to isolate the precipitated catalyst complex. The recovered solids are reslurried in a solution of 60 mL water, 140 mL t-butanol and 2 grams of the poly(propylene oxide), homogenized for 10 minutes and filtered again. The solids are then reslurried in a solution of 200 mL t-butanol and 1 g of the poly(propylene oxide) and homogenized and filtered as before. The recovered solids are then dried overnight in a vacuum oven at 50° C. They are designated Catalyst Complex A.

B. Propylene Oxide Polymerizations

1. Room temperature polymerization

The activity of Catalyst Complex A is evaluated by mixing 0.1 g of Catalyst Complex A and 3 g of propylene oxide in a capped glass vial, and allowing the mixture to stir at room temperature until polymerization of the propylene oxide occurs, as evidenced by a vigorous exotherm and rapid conversion to a thick, viscous polymer. Polymerization is complete in about eight hours.

2. Initiated elevated temperature polymerization 30 grams of a 700 MW poly(propylene oxide) triol and 0.2 grams of Catalyst Complex A are mixed in a Parr reactor. After purging with nitrogen, the mixture is heated to 100° C. and pressurized to 50 psig with propylene oxide. Propylene oxide polymerization begins, as indicated by a drop in pressure inside the Parr reactor. An exotherm of 40° C. is observed. When the propylene oxide is consumed, the Parr reactor is repressurized to 50 psig with additional propylene oxide, until a total of 140 g of propylene oxide has been added and polymerized. The calculated equivalent weight of the product is about 1000.

EXAMPLE 2

A. Preparation of Catalyst Complex B

Catalyst Complex B is prepared in the same manner as Catalyst Complex A, except 7.6 g (0.023 mol) of potassium hexacyanocobaltate is used, 0.4 g (0.001 mol) of sodium hexanitrocobaltate is used, and the 4000 molecular weight poly(propylene oxide) is replaced by a 450 molecular weight poly(propylene oxide) triol.

B. Propylene Oxide Polymerizations

1. Room Temperature Polymerization

A room temperature polymerization is conducted using Catalyst Complex B as described in Example 1B1. Polymerization is complete in about 8 hours.

2. Initiated elevated temperature polymerization

An elevated temperature polymerization is conducted using Catalyst Complex B as described in Example 1B2. After a 9-minute induction period, polymerization begins, accompanied by an exotherm of 80° C., which appears each time more propylene oxide is charged to the reactor. The unsaturation level of the resulting polyether polyol is 0.007 meq/g.

EXAMPLE 3

A. Preparation of Catalyst Complex C

Catalyst Complex C is prepared in the same manner as Catalyst Complex A, except 7.2 g (0.022 mol) of potassium hexacyanocobaltate and 0.8 g (0.002 mol) of sodium hexanitrocobaltate are used.

B. Propylene Oxide Polymerizations

1. Room Temperature Polymerization

A room temperature polymerization is conducted using Catalyst Complex C as described in Example 1B1. Polymerization is complete in about 2 hours.

2. Initiated elevated temperature polymerization

An elevated temperature polymerization is conducted using Catalyst Complex C as described in Example 1B2. After a short induction period, polymerization begins, accompanied by a well-controlled exotherm, which appears each time more propylene oxide is charged to the reactor. There is no measurable unsaturation level in the resulting polyether. The polydispersity is 4.17. When repeated, a polyol having an unsaturation of 0.008 meq/g is obtained.

EXAMPLE 4

A. Preparation of Catalyst Complex D

Catalyst Complex D is prepared in the same manner as Catalyst Complex C, except the t-butanol is replaced by glyme.

B. Propylene Oxide Polymerizations

1. Room Temperature Polymerization

A room temperature polymerization is conducted using Catalyst Complex D as described in Example 1B1. Polymerization is complete in about 1 hour.

2. Initiated elevated temperature polymerization

An elevated temperature polymerization is conducted using Catalyst Six Complex D as described in Example 1B2. After a short induction period, polymerization begins, accompanied by a large exotherm, which appears each time more propylene oxide is charged to the reactor. The unsaturation level of the resulting polyether polyol is 0.010 meq/g, and the polydispersity is 1.28.

EXAMPLE 5

A. Preparation of Catalyst Complex E

Catalyst Complex E is prepared in the same manner as Catalyst Complex A, except (1) 6.4 g (0.019 mol) of potassium hexacyanocobaltate is used, (2) 1.6 g (0.004 mol) of sodium hexanitrocobaltate is used, (3) the 4000 molecular weight poly(propylene oxide) is replaced by a 450 molecular weight poly(propylene oxide) triol and (4) less vigorous stirring is used in the precipitation step.

B. Propylene Oxide Polymerizations

1. Room Temperature Polymerization

A room temperature polymerization is conducted using Catalyst Complex E as described in Example 1B1. Polymerization is complete in about 4 hours.

2. Initiated elevated temperature polymerization

An elevated temperature polymerization is conducted using Catalyst Complex E as described in Example 1B2. After a 9-minute induction period, polymerization begins, accompanied by a barely noticeable exotherm. Somewhat larger but controlled (10–50° C.) exotherms are seen on subsequent propylene oxide additions. The unsaturation level of the resulting polyether polyol is 0.012 meq/g and the polydispersity is 1.57.

EXAMPLE 6

A. Preparation of Catalyst Complex F

Catalyst Complex F is prepared in the same manner as Catalyst Complex A, except (1) 4.05 g (0.012 mol) of potassium hexacyanocobaltate is used, (2) 3.9 g (0.0096 mol) of sodium hexanitrocobaltate is used, (3) the 4000 molecular weight poly(propylene oxide) is replaced by a 450 molecular weight poly(propylene oxide) triol and (4) less vigorous stirring is used in the precipitation step.

B. Propylene Oxide Polymerizations

1. Room Temperature Polymerization

A room temperature polymerization is conducted using Catalyst Complex F as described in Example 1B1. Polymerization is complete in about 5 hours.

2. Initiated elevated temperature polymerization

An elevated temperature polymerization is conducted using Catalyst Complex F as described in Example 1B2. After a 7-minute induction period, polymerization begins, accompanied by a 25° C. exotherm. Somewhat larger exotherms are seen on subsequent propylene oxide additions. The unsaturation level of the resulting polyether polyol is 0.022 meq/g and the polydispersity is 1.26.

EXAMPLE 7

A. Preparation of Catalyst Complex G

Catalyst Complex G is prepared in the same manner as Catalyst Complex A, except (1) 4.8 g (0.0097 mol) of potassium hexacyanocobaltate is used, (2) 3.2 g (0.0097 mol) of sodium hexanitrocobaltate is used, and (3) less vigorous stirring is used in the precipitation step.

B. Propylene Oxide Polymerizations

1. Room Temperature Polymerization

A room temperature polymerization is conducted using Catalyst Complex G as described in Example 1B1. Polymerization is complete in about 45 minutes.

2. Initiated elevated temperature polymerization

An elevated temperature polymerization is conducted using Catalyst Complex G as described in Example 1B2. After a 9-minute induction period, polymerization begins, accompanied by a 25° C. exotherm. Exotherms of increasing magnitude are seen on subsequent propylene oxide additions. The unsaturation level of the resulting polyether polyol is 0.014 meq/g and the polydispersity is 2.40.

What is claimed is:

1. A catalyst represented by the general structure:

$$M_b[M^1(CN)_6]_c[M^2(NO_2)_6]_d \cdot zL \cdot aH_2O \cdot nM^3{}_xA_y,$$

wherein M and $M^3$ are metal ions that form an insoluble precipitate with the $M^1(CN)_6$ and $M^2(NO_2)_6$ ions, and which have at least one water soluble salt;

$M^1$ and $M^2$ are trivalent transition metal ions;

L represents an organic complexing agent selected from the group consisting of alcohols, aldehydes, ketones, ethers, amides, nitrites, sulfides and compounds having a S=O group;

A represents an anion that forms a water-soluble salt with the $M^3$ ion;

b, c and d are numbers that reflect an electrostatically neutral complex, with the ratio of c:d being from about 50:50 to about 99:1; and z, n and a are positive numbers indicating the relative quantities of the complexing agent, water molecules and $M^3{}_xA_y$, respectively.

2. The catalyst of claim 1 wherein $M^1$ and $M^2$ are each $Co^{+3}$ or $Fe^{+3}$.

3. The catalyst of claim 1 wherein M and $M^3$ are zinc ions.

4. The catalyst of claim 3 wherein the molar ratio of hexacyanometallate to hexanitrometallate groups is from about 80:20 to about 96:4.

5. The catalyst of claim 4 wherein the complexing agent is t-butanol, 1-t-butoxy-2-propanol, dimethyl sulfoxide, a polyether polyol having an equivalent weight of about 75–350, or a dialkyl ether of an alkylene or polyalkylene glycol.

6. In a process for polymerizing an epoxide compound by contacting said epoxide compound with a polymerization catalyst in the presence of an initiator compound, the improvement wherein the polymerization catalyst is represented by the general structure $$M_b[M^1(CN)_6]_c[M^2(NO_2)_6]_d \cdot zL \cdot aH_2O \cdot nM^3{}_xA_y,$$

wherein M and $M^3$ are metal ions that form an insoluble precipitate with the $M^1(CN)_6$ and $M^2(NO_2)_6$ ions, and which have at least one water soluble salt;

$M^1$ and $M^2$ are trivalent transition metal ions;

L represents an organic complexing agent selected from the group consisting of alcohols, aldehydes, ketones, ethers, amides, nitrites, sulfides and compounds having a S=O group;

A represents an anion that forms a water-soluble salt with the $M^3$ ion;

b, c and d are numbers that reflect an electrostatically neutral complex, with the ratio of c:d being from about 50:50 to about 99:1; and z, n and a are positive numbers indicating the relative quantities of the complexing agent, water molecules and $M^3{}_xA_y$, respectively.

7. The improved process of claim 6, wherein the epoxide compound is propylene oxide or a mixture of propylene oxide and up to about 15 weight percent of ethylene oxide.

8. The improved process of claim 7, wherein the product of the process is a polyether having a hydroxyl equivalent weight of from about 800 to about 5000.

9. The improved process of claim 8, wherein the polyether contains no more than 0.02 meq/g of unsaturation.

10. The improved process of claim 9, wherein the polyether contains no more than 0.01 meq/g of unsaturation.

11. The improved process of claim 9, wherein $M^1$ and $M^2$ are each $Co^{+3}$ or $Fe^{+3}$.

12. The improved process of claim 11 wherein M and $M^3$ are zinc ions.

13. The improved process of claim 12 wherein the molar ratio of hexacyanometallate to hexanitrometallate groups is from about 80:20 to about 96:4.

14. The improved process of claim 13 wherein the complexing agent is t-butanol, 1-t-butoxy-2-propanol, dimethyl sulfoxide, a polyether polyol having an equivalent weight of about 75–350, or a dialkyl ether of an alkylene or polyalkylene glycol.

15. A method of making an active polymerization catalyst, comprising (a) forming a first solution of water soluble hexacyanometallate and hexanitrometallate compounds, said hexacyanometallate and hexanitrometallate compounds being present in proportions such that said aqueous solution contains a molar ratio of hexacyanometallate to hexanitrometallate ions of about 50:50 to 99:1, (b) mixing said first solution with a second solution of a water soluble salt of a metal that forms a water-insoluble precipitate with hexacyanometallate and hexanitrometallate ions so as to precipitate a metal [hexacyanometallate hexanitrometallate], and (c) either simultaneously or after step (b), contacting said metal with an organic complexing agent selected from the group consisting of alcohols, aldehydes, ketones, ethers, amides, nitrites, sulfides and compounds having a S=O group and, if no stoichiometric excess of metal salt is used in step (b), an additional quantity of a metal salt.

16. The process of claim 15, wherein said water soluble hexacyanometallate compound is represented by the structure $B_3[M^1(CN)_6]$ and said water soluble hexanitrometallate compound is represented by the structure $B_3[M2(NO_2)_6]$, where B is hydrogen or an alkali metal.

17. The process of claim 16, wherein said metal is zinc.

18. The process of claim 17, wherein the molar ratio of hexacyanocobaltate to nitroferricyanide groups is from about 80:20 to about 96:4.

19. The process of claim 18 wherein the complexing agent is t-butanol, 1-t-butoxy-2-propanol, dimethyl sulfoxide, a polyether polyol having an equivalent weight of about 75–350 or a dialkyl ether of an alkylene or polyalkylene glycol.

* * * * *